United States Patent [19]

Greene et al.

[11] Patent Number: 4,661,405
[45] Date of Patent: Apr. 28, 1987

[54] TEXTILES TREATED WITH HIGHER ALKYL MODIFIED EPOXY TERPOLYMERIC SILICONES

[75] Inventors: George H. Greene, Croton-On-Hudson, N.Y.; Robert A. Daniele, Jr., Naperville, Ill.

[73] Assignee: Union Carbide Corporation, Danbury, Conn.

[21] Appl. No.: 594,718

[22] Filed: Mar. 29, 1984

[51] Int. Cl.$^4$ .............................................. D02G 3/00
[52] U.S. Cl. .................... 428/391; 428/375; 428/392; 428/393; 428/394; 428/395
[58] Field of Search ............... 428/364, 375, 392, 393, 428/394, 395, 391, 447; 427/386; 252/8.6

[56] References Cited

U.S. PATENT DOCUMENTS

| | | | |
|---|---|---|---|
| 3,251,794 | 5/1966 | Paliyenko et al. | 260/29.2 |
| 3,271,189 | 9/1966 | Hofmann | 117/138.8 |
| 3,639,154 | 2/1972 | Sawa et al. | 117/138.8 |
| 3,949,140 | 4/1976 | Biefeld et al. | 428/391 |
| 3,953,651 | 4/1976 | Sone et al. | 428/391 |
| 3,993,837 | 12/1976 | Foley et al. | 428/392 |
| 4,020,199 | 4/1977 | Nomura et al. | 427/334 |
| 4,020,212 | 4/1977 | Erickson | 428/361 |
| 4,054,695 | 10/1977 | Johnson | 427/390 |
| 4,062,999 | 12/1977 | Kondo et al. | 428/395 |
| 4,184,004 | 1/1980 | Pines et al. | 427/386 |
| 4,247,592 | 1/1981 | Kalinowski | 428/266 |
| 4,388,437 | 6/1983 | Ona | 524/588 |

FOREIGN PATENT DOCUMENTS

953058 8/1974 Canada .

*Primary Examiner*—Lorraine T. Kendell
*Attorney, Agent, or Firm*—Steven H. Flynn

[57] ABSTRACT

Compositions comprising higher alkyl modified epoxy silicone terpolymers having the general formula:
$MD_xD'_yD''_zM$ wherein
$M = R_3SiO_{\frac{1}{2}}$
$D = R_2SiO$
$D' = E\text{—}C_bH_{2b}Si(R)O$ E is either

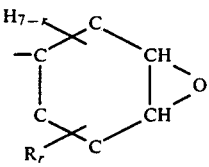

or

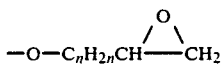

$D'' = R'Si(R)O$
R + lower alkyl of 1 to 6 carbon atoms
R' — high alkyl of at least 6 carbon atoms
r = 0 to 7
b = 2 to 12
x = 20 to 500
y = 4 to 15
z = 4 to 40

$$\frac{y}{x+y+z} = \text{preferably at least 0.01}$$

$$\frac{z}{x+y+z} = \text{preferably at least 0.03}$$

said higher alkyl modified epoxy silicones are formed into aqueous emulsions using anionic and non-ionic emulsifiers. The resulting emulsions are useful as fiber and/or textile finishes.

42 Claims, No Drawings

TEXTILES TREATED WITH HIGHER ALKYL MODIFIED EPOXY TERPOLYMERIC SILICONES

BACKGROUND OF THE INVENTION

1. Field of the Invention

This invention relates to the use of higher alkyl modified epoxy silicones, which can be formed into emulsions, as a fiber finish. These silicone emulsions are applied to the fiber or a textile and are cured at relatively low temperatures.

2. Description of the Prior Art

Aqueous emulsions of epoxy-silicones have been used for textile fabrics using nonionic or anionic emulsifiers to prepare the water-dispersible emulsions.

Silicones are used as treatments for synthetic fibers to improve hand, loft and recovery from load. Silicone treated fiber is frequently used as filling for pillows, sleeping bags and comforters because of down-like aesthetics imparted by silicone finishing. Unreactive or nonsubstantive silicones such as dimethylsilicones are generally recognized as being unsuitable because of poor aesthetic properties and unacceptable durability after washing.

Crosslinking and substantivity of the finish on fiber surfaces is extremely critical in developing suitable properties for use as filling material (usually known in the trade as fiberfill). When crosslinking is effected, interfiber friction is reduced, which results in a non-scroopy fibrous assembly with a soft hand. The level of softness as qualitatively measured by hand correlates well with a numerical index of interfiber friction known as staple pad friction (SPF). Typically, crosslinking requires curing at 80° C.–190° C., although a few examples of curing at temperatures of 50° or below have been noted.

In addition, crosslinking enhances durability to repeated home and commercial laundering. Finishes which are not crosslinked are readily removed from fiber surfaces, resulting in a harsh, scroopy assembly which has poor aesthetics. Although crosslinked finishes are more durable, most undergo a significant loss of desirable properties after five machine washings. Ideally, a finish would retain its original properties after repeated washings.

Current silicone finishes are generally applied to fiberfill as aqueous compositions and cured. In many cases, specially designed ovens which operate at high temperatures are required to achieve complete curing. Use of finishes that require curing under such conditions incurs several disadvantages. Excessively high cure temperature will result in high energy consumption and cost. But, more fundamentally, the properties imparted by these finishes are usually very sensitive to moderate changes in cure temperatures. As a result, nominal changes in process conditions result in significant changes in aesthetics and durability. Clearly, a highly desirable finish is one which develops consistent properties over a very broad range of process conditions.

In U.S. Ser. No. 537,670 filed Sept. 30, 1983, now abandoned, epoxyalkylsilicones are taught as gypsum paper sizes. Development of desirable properties at neutral pH without alum catalyst and curing at ambient temperature are claimed as novel advantages. Novel performance was attributed to an orientation effect which enhanced reaction with hydroxyl and carboxyl groups in cellulosic substrates such as paper. Although ambient curing is cited, it is extremely surprising and unobvious that use of these compounds on substrates such as polyester and polypropylene would result in low friction and durable surfaces without curing at elevated temperatures. The low concentration of reactive groups present on the surface of polyester and the absence of reactive groups in the case of polypropylene would suggest that direct reaction of epoxy groups with the substrate surface is highly unlikely.

In U.S. Ser. No. 480,701 filed Mar. 31, 1983, now U.S. Pat. No. 4,579,964, alkoxysilyl functional silicones are taught as useful in achieving desirable properties when applied and cured on textiles and fiberfill. Unusually good durability is cited as an unexpected advantage. However, U.S. Ser. No. 480,701 teaches that high durability is achieved only by effecting crosslinking in the presence of a catalyst such as p-toluene sulfonic acid. Examples of use suggest that best performance is obtained only by curing at elevated temperatures. No mention is made of attaining desirable properties by curing at room temperature.

In U.S. Pat. No. 3,251,794 (Paliyenko, Paul, et. al, May 17, 1966) the treatment of synthetic fiber filaments with mixture of dimethylsilicones and methylhydrogensilicones to improve resilience and bulk is taught. Best performance was obtained by curing in the presence of zinc acetate/organic titanate catalysts at 150° C. Attainment of desirable properties at ambient conditions is not indicated.

In U.S. Pat. No. 3,271,1989 (Hoffman, Hugo, Sept. 6, 1966) the use of crosslinkable mixtures of dimethylsilicones and methylhydrogensilicones as treatments for polyester fibers is taught. Examples indicate that best performance was obtained by curing at 132° C. using a zinc catalyst. One example suggests that desirable properties could be attained at ambient conditions without catalysis. Teachings indicate that noncurable silicones are unsuitable for these uses. However, attempts to verify this effect proved unsuccessful.

In U.S. Pat. No. 3,639,154 (Soshio, S; et. al. Feb. 7, 1972) a process in which improved hand and water repellency are imparted to fibrous structures by treatment with mixtures of methylhydrogensilicones, dimethylsilicones, and polyethylene glycols was taught. Examples indicate that curing at 90° C.–170° C. and catalysis with zinc octoate is required to develop desirable properties.

In U.S. Pat. No. 3,953,651 (Sone, Masao, et al., Apr. 27, 1976) animal hairlike properties are imparted to acrylic fibers by treatments with amino modified dimethylsilicone. Examples cite use of curing temperatures of 100° C.–130° C.

In U.S. Pat. No. 4,020,199 (Nomura, Katsuaki, et. al, Apr. 26, 1977) aminosilicone treatment of acrylic fibers to impart animal hairlike hand is disclosed. The patent specifies that desirable properties are achieved by drying at 60° C.–140° C. but preferably at 80° C.–120° C.

In U.S. Pat. No. 4,020,212 (Erickson, Wayne K) treatment of polyolefin fiber with mixtures of poly(ethyleneoxide) modified silicone and quaternary ammonium salts is reported to reduce scroopiness. Apparently, treatment is applied before crimping, which implies a heat treatment of 80° C.–150° C. Significantly, durability characteristics are not discussed in teachings or examples.

In U.S. Pat. No. 4,054,695 (G. C. Johnson, October, 1977) treatment of synthetic fibers with mixtures of silicones and ethylenediamine tetraacetic acid are reported to yield nonflammable fibers with good lubricity. Examples indicate that a cure at 160° C. is required to effect desirable properties.

In U.S. Pat. No. 4,062,999 (Kondo, Takimitsu, et. al, Dec. 13, 1977) the use of mixtures of aminosilanes and epoxysilicones as a treatment for synthetic fibers used for filling is taught. Examples indicate that best performance was obtained by curing at 140° C.

In U.S. Pat. No. 4,247,592 (Kalinowski, Rober E., January 1981) the use of aminoalkyl containing polydiorganosiloxanes which improves hand of fiberfill without enhancing flammability is taught. Low temperature curing at 50° C.-70° C. effects improvement but examples suggest that best performance is obtained by curing at 107° C.-204° C.

In U.S. Pat. No. 4,388,437 (Ona, Isao, June 14, 1983) the use of titanate, zirconate and germanate compounds with aminofunctional silicones is reported to cause quantitative exhaustion of silicones from mother liquor to substrate surfaces. Examples indicate that curing at 105° C.-150° C. was necessary for best performance. Although fabric properties such as hand, crease resistance and impact resistance was measured, apparently no attempt was made to determine durability.

In Belgium 875-335 (Solomon, Monfred; et. al, Oct. 9, 1979) claims treatment of fiberfill with mixtures of OH terminated dimethysilicone and bisphenol A diglycidyl ether-hexamethylene diamine polymer. Mixture was catalyzed with organotin compounds and cured at 140° C.-200° C. after application to fiberfill.

In Canada 953,058 (Sugiura, Takahisa; et. al, Aug. 20, 1974) the treatment of synthetic fibers with mixtures of dimethylsilicones, aminosilanes, and glycidoxy silanes results in improved hand. Development of desirable properties requires use of zinc 2-ethylhexanoate catalyst and a heat treatment.

In D.E. 2,356,895 (Fujimatsu, Masaski, May 30, 1974) Wool-like properties are imparted to acrylic fibers by treatment with aminomodified silicones. Curing steps of 125° C.-150° C. were specified.

In D.E. 2,449,400 (Betz, Helmut, et. al, Apr. 22, 1976) sequential treatment with poly(ethylene) and then with a mixture of hydroxyterminated dimethylsilicone and methylhydrogen silicone gives desirable fiberfill properties. Finish is applied before crimping with curing effected during crimping.

In Japan Kokai 74,133,698 Sono, Hirofumi, et. al, Dec. 23, 1974) synthetic fibers were treated with mixtures of organopolysiloxanes and aminoalkoxysilane to improve hand. The silicone mixtures were catalyzed with zirconium acetate and cured at 160° C.).

SUMMARY OF THE INVENTION

This invention relates to the use of modified alkyl higher epoxy silicone compositions as a fiber and/or textile finish. The compositions are capable of curing under ambient conditions when applied to the fiber or textile. The compositions contain end-blocked siloxane chains containing in major proportions repeating di(-lower alkyl)siloxy units, e.g., dimethylsiloxy units, minor proportions of repeating siloxy units containing silicon-bonded higher alkyl groups, e.g., octadecylsiloxy units, and minor proportions of repeating siloxy units having silicon-bonded 3,4-epoxycyclohexylalkyl units.

The invention also provides aqueous emulsions of the silicon terpolymers that are readily water-dispersible and are capable of forming, with additional water, dispersions suitable for imparting a soft hand and durability to the fiber or textile as well as good SPF. The emulsions are stable and can be stored for extended periods of time before sale and shipment to the fiber manufacturer for use in producing textiles.

This invention also provides a commercial process for the treatment of fibers and textiles.

DESCRIPTION OF THE INVENTION

The compositions employed in this invention comprise higher alkyl modified epoxy silicone terpolymers having the general formula: $MD_xD'_yD''_zM$ wherein M in each case is an end-blocking siloxy unit of the formula: $R_3SiO_{1/2}$ wherein R is a lower alkyl group having 1 to 6 carbon atoms, e.g., methyl, ethyl, propyl and the like, and preferable is methyl; D is a repeating di(lower alkyl) siloxy unit of the formula: $R_2SiO$ wherein R is as defined above, preferably methyl; D' is a repeating epoxy-containing siloxy unit of the formula:

$$E\text{-}C_bH_{2b}Si(R)O$$

where E is an epoxy containing group selected from either

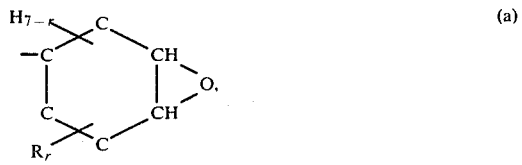

(a)

or

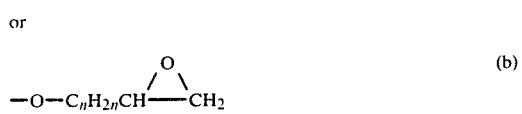

(b)

where n is from 1 to 12, preferably from 1 to three and most preferably 1, wherein R is as defined above, preferably methyl, b is an integer of 2 to 12, preferably 2–6 and most preferably 2, and r is an integer of 0 to 7, preferably 0 to 3, most preferably 0; D" is a repeating higher alkyl-containing siloxy unit having the formula: $R'Si(R)O$ wherein R is as defined above, preferably methyl, and R' is a higher alkyl group of at least 6 carbon atoms, preferably 10 to 30 carbon atoms, more preferably 12 to 26 carbon atoms, most preferably 12 to 24 carbon atoms, x is an integer of 20 to 500, preferably 30 to 350, most preferably 100 to 300; y is an integer of 4 to 15, preferably 5 to 12, most preferably 8 to 12; and z is an integer of 4 to 40, preferably 7 to 30, most preferably 10 to 28. It is preferred that the novel terpolymer composition have a proportion of D' repeating siloxy units to the totals of 11 repeating siloxy units, i.e., $D+D'+D''$, of a least 0.01, that is, the ratio of at least 0.01, that is, the ratio of y to the total of $x+y+z$ preferably, is at least 0.01, i.e., $$\frac{y}{x+y+z} = \text{at least } 0.01$$

Most preferably, the ratio $y/x+y+z$ is in the range of 0.01 to 0.2. Preferably, the novel terpolymer compositions have a proportion of D" repeating siloxy units to the total of all repeating siloxy units, i.e., $D+D'+D''$, of at least 0.03, that is $z/x+y+z$ is at least 0.03. Most preferably, the ratio $z//x+y+z$ is in the range of 0.03 to 0.5. The molecular weight of the novel terpolymers can be varied over a wide range, e.g., from 1000 to $10^6$. The least preferred terpolymers from the standpoint of treating fibers are the terpolymers having molecular weights at the low end of the range. The most preferred fiber treating terpolymers are at the higher end of the range; however, the highest molecular weight terpolymers could be difficult to manufacture and emulsify.

The preferred epoxy-containing repeating siloxy unit is 2-(3,4-epoxycycolohexyl)ethyl(methyl)siloxy, $(OC_6H_9C_2H_4)(Me)SiO$. Other epoxy-containing siloxy units, however, can be used in the novel terpolymers such as 2(6-methyl-3,4-epoxycyclohexyl)-ethyl(methyl)siloxy; 3-(3,4-epoxycychohexyl)-propyl(methyl)siloxy; 2(2-3epoxy-3,-4-cyclohexyl)ethyl(methyl)siloxy; 6(3,4-cyclohexyl)-hexyl(methyl)siloxy; 4(2,5-dimethyl-3,4-epoxy-cyclohexyl)butyl(methyl)siloxy; and the like.

The higher alkyl-containing repeating siloxy unit R'(R)SiO is preferably R'(Me)SiO wherein R' is 8 to 30. Suitable repeating units of this type include straight chain or branched chain higher alkyl groups, such as, (octadecyl) (methyl)siloxy; (decyl)(methyl)siloxy, (dodecyl) (methyl)siloxy; (hexadecyl)(methyl)siloxy, (docosyl)(methyl)siloxy; (docosyl)(methyl)siloxy, (tetracosyl)(methyl)siloxy; (hexacosyl) (methyl)siloxy,(-triacontyl)(methyl)siloxy and the like.

The preferred repeating di(lower alkyl)siloxy unit, $R_2SiO$ is dimethylsiloxy, $Me_2SiO$. Other units of this type that can be employed in the novel terpolymers are (methyl)(ethyl)siloxy, diethylsiloxy, dipropylsiloxy, (methyl)(hexyl)siloxy, dibutylsiloxy and the like. The preferred end-blocking units, $R_3SiO_{1/2}$, is trimethylsiloxy. Other end-blocking units can be employed in the novel terpolymers including triethylsiloxy, tripropylsiloxy and the like.

The higher alkyl modified epoxy silicone terpolymers of this invention are prepared by methods that are well known in the art and can conveniently be prepared, among other methods, by the platinum catalyzed addition of aliphatically unsaturated epoxy compounds and higher alkenes, (e.g., $C_mH_{2m}$, wherein m is an integer of at least 8) to hydrosiloxanes, the ratio of reactants being such as to prevent the presence of unreacted, i.e., residual, hydrosiloxane moieties. It is to be understood however that trace hydrosiloxane contamination in the silicone can be tolerated without unduly affecting the terpolymeric compositions and processes of this invention, but preferably the silicone is hydrosiloxane-free. By trace amounts of hydrogen-siloxane is meant not more than that amount which will produce about 2 cc, hydrogen per gram of silicone by the NaOH gas evolution method.

Suitable aliphatically unsaturated epoxy compounds include 1-vinyl-3,4-epoxycyclohexane, 1-vinyl-6-methyl-3,4-epoxycyclohexane, 1-vinyl-2-ethyl-3,4-epoxycyclohexane, 1-hexenyl-3,4-epoxycyclohexane, 1-butenyl-2,-5-dimethyl-3, 4-epoxycyclohexane, and the like. Suitable higher alkenes are characterized by the formula $C_mH_{2m}$ wherein m is an integer of at least 8, preferably 10 to 30 carbon atoms, more preferably 12 to 26 carbon atoms and most preferably 12 to 24 carbon atoms and include octene-1, decene-1, dodecene-1, tetradecene-1, hexadecene-1, octadecene-1, epicosene-1, docosene-1, tetracosene-1, hexacosene-1, octacosene-1, triacontene-1, and the like.

The hydrosiloxane reactants are well known and are characterized by the general formula:

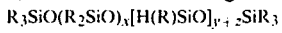

wherein r, x, y and z are as previously defined. In the addition reaction y moles of aliphatically unsaturated epoxy compound and z moles of higher alkene are theoretically required for each mole of hydrosiloxane in order to provide a terpolymer silicone having the desired proportions of x repeating di(lower alkyl)siloxy units, of y repeating epoxy-containing siloxy units and z repeating higher alkyl siloxy units. However, in practice, in order to assure reaction of most if not all silanic hydrogen of the hydrosiloxane excesses of the aliphatically unsaturated reactants over the theoretical amounts are used, e.g., 110% of theoretical for the aliphatically unsaturated epoxy compound, 120% of theoretical for the liquid higher alkenes and 130 to 135% of theoretical for the other higher alkenes.

The hydrosiloxanes are prepared by well known techniques of equilibrating mixtures of appropriate proportions of end-blocked lower alkyl silicones, e.g., $Me_3SiO(Me_2SiO)_3SiMe_3$, SiH fluids, e.g., $Me_3SiO(MeSiHO)_{40}SiMe_3$, and cyclic lower alkyl siloxanes, e.g., the cyclic tetramer of methyl siloxane, $[Me_2SiO]_4$ in the presence of a suitable equilibration catalyst, e.g., $CF_3SO_3H$, $H_2SO_4$ and the like. After equilibrating under warm temperatures, e.g, 30° C., for a sufficient time, e.g., 4 hours, the resulting hydrosiloxane is neutralized, e.g., with sodium bicarbonate and filtered. The proportions and compositions of lower alkyl silicone, SiH fluid and cyclicsiloxanes are selected to provide the desired hydrosiloxane, e.g., $Me_3SiO(Me_2SiO)_x(MeSiHO)_{x+z}SiMe_3$ that is the two moles of end-blocking units, x moles of di(lower alkyl)siloxy units and y+z moles of MeSiHO units per mole of hydrosiloxane.

The novel water-dispersible aqueous emulsions of this invention are capable of being dispersed in water to form aqueous dispersions which when applied to a fiber. The aqueous terpolymer emulsions contain the silicone terpolymer as described above, water and a suitable emulsifier which can be anionic, non-ionic or cationic. The anionic and nonionic emulsifiers and mixtures thereof are preferred. The amount of novel silicone terpolymer in the novel emulsions can be varied over a wide range, for example, from 10 to 60 wt. %, preferably 15 to 40 wt. %. The amount and exact emulsifier composition is determined by the practical consideration of application procedure, emulsion stability and minimum interference with the novel terpolymeric silicone properties. Non-ionic emulsifiers include alcohol ethoxylates, such as Tergitol-S surfactants, e.g., Tergitol 15-S -3 and Tergitol 15-S-12 and mixtures of Tergitol 15-S-3 and Tergitol 15-S-12, Pluronic F-108 (an ABA block copolymer containing about 80% polyethylene glycol capped with 20% polypropylene glycol), trimethylnonylpolyethylene glycol ether/nonylphenylpolyethylene glycol ether blends, poly(vinyl alcohol), and polyoxyethylene ester of mixed- fatty and resin acids; cationic emulsifiers include N-cetylethyl morpholinium ethosulfate, and cationic starch, either alone or in combination with poly(vinyl alcohol) or sodium lignin sulfonate. Suitable anionic emulsifiers are lauryl alcohol sulfate in combination with poly(vinyl alcohol), alkali metal dialkyl sulfosuccinates containing 14 to 22 carbons, alkali metal, morpholine and alkanolamine salts of alkylaryl sulfonic acids containing 1 to 18 carbons in the alkyl group and 6 to 10 carbons in the aryl group, alkali metal salts of alkylaryl polyether sulfonic acids having 1 to 18 carbons in the alkyl group and 6 to 10 in the aryl group, alkali metal salts of alkyl naphthalene sulfonic acids having 1 to 18 carbons in the alkyl group, and alkane sulfonates, such as, commercially available petroleum sulfonates having about 6 to 24 carbons and $C_{17}H_{33}CON(CH_3)-C_2H_4SO_3Na$, available as Igepon T-43. Particularly preferred anionic emulsifiers are the triethanolamine salt of an alkylaryl sulfonic acid commercially available as Richonate S-1280, the sodium salt of an alkyl aryl polyether sulfonate commercially available as Triton X-202, the sodium salt of an alkyl naphthalene sulfonate commercially available as Alkanol BG and mixtures thereof with non-ionic emulsifiers, e.g., Pluronic F-108.

While about 1 to about 25% of emulsifier based on the weight of the novel silicone terpolymer can be used in this invention, it is preferred to use about 1 to about 10 wt. % and even more preferred to use about 3 to 5 wt. %.

The amount of water used in preparing the novel aqueous emulsions of the terpolymer silicones defined herein with the emulsifiers defined hereinabove is not critical. It is within the knowledge of those skilled in the art to chose the desired amount depending on the desired solids content of the emulsified silicone terpolymer. This is delineated in the examples describing emulsion preparations where a grease is first prepared from a mixture of emulsifier and water blended with the silicone terpolymer. Further incremental additions, that is dropwise additions of water to the grease with agitation convert the latter to a milky white emulsion. The emulsion remains stable regardless of how much more water is added.

The emulsions of this invention are stable for long period s of storage and are readily dispersed in additional water to provide treatment dispersions for application to the fiber.

The silicone terpolymers of this invention can be applied to the fibers either before, during, or after the textile forming operation, and can be applied either per se, in emulsion form or in solution in a suitable solvent.

Typical fibers useful in the present invention include those made from rayon, acetate, polyamide, polyester, acrylic, polypropylene, proteins (i.e., silk, wool and the like), cotton, polybenzimidazole and the like. Textiles are formed from fibers such as these by weaving, knitting or some other suitable non-woven process.

The fibers are typically treated with the finish via some form of a kiss roll or capillary finish metering device. Because fibers are generally processed at speeds on an order of magnitude faster than textiles, the textiles are typically treated with the finish by a pad bath, foam finish (commonly known in the art as Foam Finish Technology or FFT) or the Triatex $^{TM}$ MA Technology.

The quantity of silicone terpolymer applied to the fiber or textile product is not narrowly critical and optimum values vary slightly with the type of fiber being treated. In general however, from about 0.005 to about 5.0 wt. % silicone terpolymer based on the weight of the fiber or textile provides adequate treatment. While it is preferred to use about 0.5 to about 1.0 wt. %.

When applying the silicone terpolymers to formed textiles, the emulsions described hereinabove are further diluted with additional water to form a dispersion containing 0.01 to 5 wt. % of the terpolymer, preferably 0.05 to 0.5 wt. %, depending upon the wet pick up of the terpolymer emulsion by the fiber. In the capacitance of this invention, curing catalysts can be used in certain instances although they are not usually needed. Such catalysts include the metal salts of strong acids as for example aluminum sulfate and zinc nitrate, and polymeric anhydrides such as poly(methyl vinyl ether/maleic anhydride), poly(styrene/maleic anhydride) tetrapropenylsuccinic anhydride and zirconium acetates. Particularly good results are obtained using zirconium acetate.

As stated hereinbefore, instead of adding the silicone terpolymer per se to the fiber or textile it is frequently advantageous to utilize the silicone in solution in an inert solvent or dispersed in an emulsion. Emulsions have been found to be appropriate for both applications. Solvent systems can be used for textile treatment. The choice of solvents and emulsifiers is governed primarily by the method of application selected and considerations regarding ease of handling. Inert organic solvents may include both aliphatic and aromatic hydrocarbon compounds and halogenated analogs thereof such as kerosene, benzene, and perchloroethylene.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

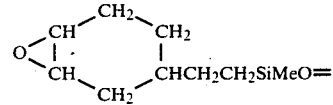

| Et: | ethyl |
| --- | --- |
| Me: | methyl |
| M: | $Me_3SiO\frac{1}{2}$ |
| D: | $Me_2SiO-$ |
| D*: | $MeHSiO=$ |
| D': | |
| D'': | $CH_3(CH_2)_{17}SIMeO=$ |
| $D_4$: | $[Me_2SiO]_4$ |
| $n^{25}D$: | index of refraction |
| cs: | viscosity in centistokes |
| cps: | viscosity in centipoise |
| °C.: | temperature in degrees Centigrade |
| °F.: | temperature in degrees Fahrenheit |
| g or gms: | weight in grams |
| M: | pore size in microns |
| Hrs: | time in hours |
| Min: | time in minutes |

Representations of formulas for silicones in the Examples and elsewhere in this specification are average or nominal formulas. Accelerated curing times at above 90° C. where used in many cases in place of ambient temperature cures which could take 1 to 3 days in the interest of developing timely results.

EXAMPLE 1

A hydrocarbon modified epoxy silicone was prepared via the following two step procedure.

Step I

To a 1-liter 3-necked round bottomed flask fitted with a mechanical agitator, heating mantle and temperature controller there were charged:

7.5 g $MD_3M$, i.e., $Me_3SiO (Me_2SiO)_3 SiMe_3$ 34.1 g MD*$_{40}$M, i.e., Me$_3$SiO(MeSiHO)$_{40}$SiMe$_3$
550.7 g D4, i.e., [Me$_2$SiO]$_4$
0.6 g CF$_3$SO$_3$H

The resulting mixture was stirred for 4 hours at 30° C. and neutralized by stirring overnight with 10 g NaHCO$_3$ wet with 0.2 g water. the reaction mixture was refined by pressure filtering through a 5M pad. The resulting SiH intermediate had the following properties:

| | |
|---|---|
| Viscosity = | 927 cs @ 25° C. |
| n$_D$25 = | 1.4026 |
| SiH content (ccH$_2$/gm) | |
| found = | 20.2 |
| calculated = | 20.42 |
| Empirical Formula = | MD$_{250}$D*$_{18}$M, i.e. Me$_3$SiO(Me$_2$SiO)$_{250}$(MeSiHO)$_{18}$SiMe$_3$ |

Step II

In a 500 ml 3-necked round-bottomed flask fitted with a mechanical agitator, thermometer equipped with a Therm-O-Watch temperature regulator, dropping funnel, N$_2$ purge tube, reflux condenser vented to the hood and a heating mantle there were reacted:

217.16 g MD$_{250}$D*$_{18}$M, i.e. Me$_3$SiO(Me$_2$Sio)$_{250}$(MeSiHO)$_{18}$SiMe$_3$
33.26 g octadecene-1 (C$_{18}$H$_{36}$)
12.0 g vinyl-3,4-epoxycyclohexnane
9.6 g Na$_2$CO$_3$ (pulverized)
25 ppm 3% Pt as H$_2$PtCl$_6$ catalyst in MeOCH$_2$CH$_2$OMe The reaction was carried out by the following procedure:

To the flask were added the MD$_{250}$D*$_{18}$M', 6.65 g octadecene and the Na$_2$CO$_3$. To the dropping funnel was charged a solution of 26.61 g octadecene and 12.0 g vinyl-3,4epoxycyclohexane. The flask was heated to 80° C. with a slight N$_2$ sparge through the head space. The Pt catalyst was added and the system was allowed to exotherm to 85° C. Over a 8–10 minute period the contents of the dropping funnel were added so that the kettle temperature attained approximately 95° C. The reaction mixture was heated 1.5 hours at 100° C. and then nitrogen sparged with 2.0 f 3/hr N$_2$ at 80° C. for thirty minutes. The reaction mixture was cooled and pressure filtered through a 2–4Mpad.

The terpolymer product had the following properties:

| | |
|---|---|
| Viscosity | 3,000 cps @ 23.5° C. |
| n D$^{25}$ | 1.4178 |
| Appearance | Crystal clear and light tan color |
| Empirical Formula | MD$_{250}$D'$_8$D''$_{10}$M, i.e., Me$_3$SiO(Me$_2$SiO$_{250}$OC$_6$H$_9$C$_2$H$_4$SiMeO)$_8$(C$_{18}$H$_{37}$SiMeO)$_{10}$SiMe$_3$ |

EXAMPLE II

A 20% emulsion of the above-described composition (MD$_{250}$D'$_8$D''$_{10}$M) was prepared by charging to a 500 cc beaker a mixture of 1.95 grams of TERGITOL 15-S-3 and 3.05 grams of TERGITOL 15-S-12. The mixture was warmed to form a homogeneous solution and then 5.0 grams of water were stirred in.

A viscous grease was then prepared by continuously adding 100.0 grams of the silicone terpolymer product (produced in Example I) in the following manner. A few drops of the terpolymer were slowly added over a period of approximately 45 minutes to the "soap solution" using a Lighting mixer equipped with a guarded stirring paddle; the stirring was continuous. A "grease" was formed which had a translucent, stiff bouncy mass. The grease was let down by adding a total of 390.0 g water, initially a few drops at a time, over a period of approximately 20 minutes. As the water was worked into the "grease", the grease became milky white and at an intermediate point, a thick but homogeneous oil-in-water emulsion was formed. With the addition of the water this material thinned to a homogeneous liquid consisting of an emulsion of the terpolymer in water.

EXAMPLE III 750 ml of emulsion diluted to one percent actives was added to a 1000 ml beaker. Approximately 60 grams of fiberfill were immersed in diluted emulsion, removed from the beaker and excess liquid allowed to drain. Then, using a Mathis Laboratory Padder (Type HVF), fiber was padded to achieve 100 percent wet pickup based on dry fiber. After padding, fiberfill samples were allowed to air dry for k48 hours. If cure temperature effects were being evaluated, samples were cured in a forced air oven for five minutes at temperatures of 120° C.–180° C. Samples were allowed to condition for three days at 70° F. and 50 percent relative humidity.

Interfiber friction was determined by a staple pad friction technique (SPF) in which a weighted sled is pulled across fiberfill variants by an Instron Tensile Tester. Since the sled's bottom and base plate's surface are covered with emery paper, individual fibers are displaced by the sled's movements. The resulting interfiber friction is measured by the Instron and recorded in grams of force. Staple pad friction is converted into an index using the following relationship:

$$\text{Stape Pad Friction Index} = \frac{\text{Sliding Force (Grams)}}{\text{Sled Weight (Grams)}}$$

Using the emulsification technique of Example II and the aforementioned padding/SPF techniques, MD$_{250}$D'$_8$D''$_{10}$M, MD$_{300}$D'$_{12}$D''$_{12}$M''', MD$_{300}$D'$_{12}$D''$_9$M, and MD$_{250}$D'$_8$D''$_{10}$M were evaluated. Results of this evaluation are recorded in Table 1.

The same techniques were used to evaluate the effect of zirconium acetate. However, the treatment bath composition was modified by adding an aqueous solution of zirconium acetate (25%) and acetic acid (25%) to obtain a final zirconium acetate concentration of 1.0 percent based on the bath's silicone concentration. The results of this evaluation are given in Table II.

EXAMPLE IV

The treatment and evaluative techniques of Example II were used to determine performance of MD$_{250}$D'$_8$D''$_{10}$M on polypropylene staple (6d, 2½ inch length Herculon obtained from Hercules Fiber Inc., Oxford, Ga. The results of this evaluation are given in Table III.

EXAMPLE V

The procedure in Example 1 as followed to synthesize an 2,3-epoxypropoxypropyl/C$_{18}$H$_{37}$ modified silicone. The following reactants were utilized:

| | |
|---|---|
| 192.4 grams | $MD_{250}D^*_{18}M$ |
| 30.2 grams | $C_{18}H_{36}$(octadecene-1) |
| 10.0 grams | Allylglycidyl ether |
| 2.0 grams | $Na_2CO_3$ |
| 25 Ppm | 3% Pt as $H_2PtCl_6$ in $MeOCH_2CH_2OME$ |

EXAMPLE VI

A forty percent emulsion of the composition prepared in Example V was made by the procedure in Example II. A surfactant mixture composed of 1.59 grams Richonate S-1280 (triethanolamine salt of dodecylbenzene sulfonic acid), Pluronic F-108 (ABA block copolymer composed of approximately 80% polyethylene glycol capped with 20% polypropylene glycol), and 2.25 grams of distilled water was used. To this mixture, 60 grams of the silicone prepared in Example V was added. The grease formed by this addition was diluted with 85.3 grams of water. The final mixture was stabilized with 0.20 grams of 37% formalin. The composition prepared was evaluated by the procedure of Example III.

TABLE 1

STAPLE PAD FRINCTION (SPF) AND DURABILITY OF EPOXYLALKYL MODIFIED DIMETHYLSILICONES WITHOUT CATALYST

| | SPF Before Washing Cure Temp °C. | | | SPF After Washing (5×) Cure Temp °C. | | |
|---|---|---|---|---|---|---|
| Lubricant | Room Temp. | 160 | 180 | Room Temp. | 160 | 180 |
| $MD_{490}D'_{10}M$ | .41 | .26 | .23 | .47 | .34 | .32 |
| $MD_{250}D'_8D''_{10}M$ | .29 | .23 | .21 | .33 | .29 | .25 |
| $MD_{250}D'_8D''_{17}M$ | .28 | .22 | .23 | .28 | .29 | .25 |
| $MD_{300}D'_{12}D''_{12}M$ | .28 | .23 | .23 | .29 | .27 | .23 |
| $MD_{300}D'_{12}D''_9M$ | .30 | .19 | .21 | .42 | .31 | .29 |
| $MD_{250}D^*_8D''_{10}M$ | .32 | .24 | .21 | .42 | .24 | .26 |
| $MD_{250}D'_8D'''_{10}M$ | .34 | .24 | .23 | .49 | .30 | .31 |
| $MD_{250}D'_8D+_{10}M$ | .34 | .27 | .22 | .36 | .35 | .28 |
| Hollofil-808 Control (Untreated) | .44 | | | .50 | | |

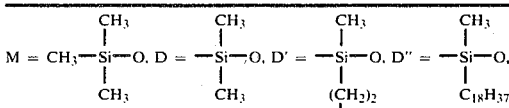

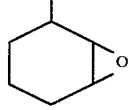

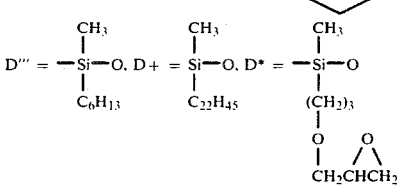

TABLE 2

STAPLE PAD FRINCTION (SPF) AND DURABILITY OF EPOXYLALKYL MODIFIED DIMETHYLSILICONES WITH CATALYST

| | SPF Before Washing Cure Temp °C. | | | SPF After Washing (5×) Cure Temp °C. | | |
|---|---|---|---|---|---|---|
| Lubricant | Room Temp. | 160 | 180 | Room Temp. | 160 | 180 |
| $MD_{490}D'_{10}M$ | .26 | .24 | .23 | .32 | .34 | .30 |
| $MD_{250}D'_8D''_{10}M$ | .24 | .23 | .20 | .27 | .24 | .27 |
| $MD_{250}D'_8D''_{17}M$ | .23 | .24 | .21 | .30 | .26 | .24 |

TABLE 2-continued

STAPLE PAD FRINCTION (SPF) AND DURABILITY OF EPOXYLALKYL MODIFIED DIMETHYLSILICONES WITH CATALYST

| | SPF Before Washing Cure Temp °C. | | | SPF After Washing (5×) Cure Temp °C. | | |
|---|---|---|---|---|---|---|
| Lubricant | Room Temp. | 160 | 180 | Room Temp. | 160 | 180 |
| $MD_{300}D'_{12}D''_{12}M$ | .24 | .25 | .21 | .25 | .23 | .24 |
| $MD_{300}D'_{12}D''_9M$ | .27 | .23 | .23 | .33 | .30 | .30 |
| $MD_{250}D^*_8D''_{10}M$ | .28 | .21 | .21 | .28 | .30 | .30 |
| $MD_{250}D'_8D'''_{10}M$ | .24 | .25 | .22 | .32 | .32 | .26 |
| $MD_{250}D'_8D+_{10}M$ | .27 | .24 | .22 | .32 | .32 | .26 |
| Hollofil-808 Control (Untreated) | .44 | | | .50 | | |

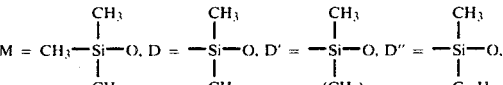

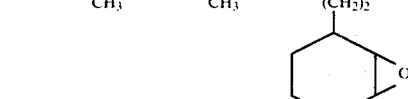

*zirconium acetate 1 wt. % actives based on silicone additives.

TABLE 3

STAPLE PAD FRINCTION (SPF) AND DURABILITY OF EPOXYLALKYL ON POLYPROPYLENE STAPLE

| | SPF Before Washing Cure Temp °C. | | SPF After 1 Wash Cure Temp °C. | |
|---|---|---|---|---|
| Lubricant | Room Temp. | 120 | Room Temp. | 120 |
| $MD_{250}D'_8D''_{10}M$[1] | .31 | .30 | .32 | .31 |
| Polypropylene Staple[2] Control (no treatment) | .43 | — | — | — |

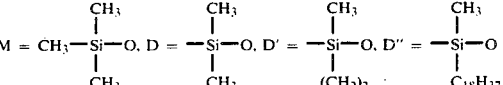

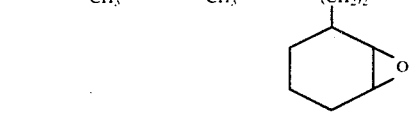

[1]Catalyzed with 1.0 weight percent zirconium acetate
[2]Herculon staple (6 denier, 2-12 inch length, bright)

COMPARATIVE EXAMPLE

An attempt to verify the room temperature curing effect reported in U.S. Pat. No. 3,454,422 was unsuccessful. The following summarizes the results of this probe.

| Composition | Before Wash SPF | After Wash SPF |
|---|---|---|
| Hollofil-808 Control (no treatment) | .45 | .47 |
| 60/40 dimethyl silicone oil 500 cs | .46 | .47 |

-continued

| Composition | Before Wash SPF | After Wash SPF |
|---|---|---|
| (500 cs)/MD$_{315}$D'$_3$M) | | |

$$D' = \begin{array}{c} CH_3 \\ | \\ -Si-O \\ | \\ H \end{array} \quad M = \begin{array}{c} CH_3 \\ | \\ CH_3-Si-O \\ | \\ CH_3 \end{array} \quad D = \begin{array}{c} CH_3 \\ | \\ Si-O \\ | \\ CH_3 \end{array}$$

As measured by SPF, treatment of fiberfill with a dimethylsilicone/methylhydrogen silicone did not improve frictional properties when allowed to dry at ambient conditions. One skilled in the art of fiberfill treatment would agree that interfiber friction is a key index of hand and resiliency. U.S. Pat. No. 3,454,422 embodies art developed early in fiberfill technology and utilized evaluative techniques which were adequate for initial needs but ae intensive by modern standards. Therefore, it is believed the oberved disparity results from more stringent performance demanded by today's consumers and from more critical modern evaluative techniques.

We claim:

1. A fiber treated with a higher alkyl modified epoxy silicone terpolymer having the general formula: $MD_xD'_yD''_zM$ wherein M in each case is an end-blocking unit of the formula: $R_3SiO_{\frac{1}{2}}$; D is a siloxy unit of the formula: $R_2SiO$; D' is an epoxy containing siloxy unit of the formula:

$$E-C_bH_{2b}Si(R)O$$

where E is an epoxy containing group selected from either

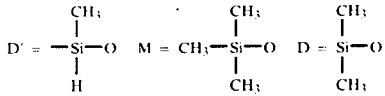
(a)

or

(b)

where n is from 1 to 12, D" is a siloxy unit of the formula R'Si(R)O; R is a lower alkyl group having 1 to 4 carbon atoms; R' is a higher alkyl group of at least 6 carbon atoms; x is an integer of 20 to 500; y is an integer of 4 to 15; z is an integer of 4 to 40; b is an integer of 2 to 12; and r is an integer of 0 to 7.

2. The fiber as claimed in claim 1 wherein D' is a siloxy unit of the formula:

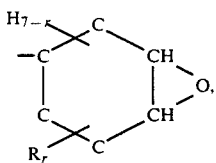

R is methyl, R' is an alkyl group having 10 to 30 carbon atoms, x is an integer of 30 to 350, y is an integer of 5 to 12, z is an integer of 7 to 30, the ratio of $y/x+y+z$ is at least 0.01 and the ratio of $y+z/x+y+z$ is at least 0.03.

3. The fiber as claimed in claim 2 wherein R' is an octadecyl group, x is an integer of 100 to 300, y is an integer of 8 to 12, z is an integer of 10 to 28, the ratio of $y/x+y+z$ is 0.01 to 0.2 and the ratio of $y+z/x+y+z$ is 0.03 to 0.5.

4. The fiber as claimed in claim 3 wherein the silicone has the general formula: $MD_{300}D'_{12}D''_{12}M$.

5. The fiber as claimed in claim 3 wherein the silicone has the general formula: $MD_{300}D'_9D''_{12}M$.

6. The fiber as claimed in claim 3 wherein the silicone has the general formula: $MD_{247.5}D'_{10}D''_{10}M$.

7. The fiber as claimed in claim 3 wherein the silicone has the general formula: $MD_{250}D'_8D''_{10}M$.

8. The fiber as claimed in claim 1 wherein the silicone has the general formula: $MD_{250}D'_8D''_5M$.

9. The fiber as claimed in claim 1 wherein the silicone has the general formula: $MD_{115}D'_4D''_{11}M$.

10. The fiber as claimed in claim 2 wherein the silicone has the general formula: $MD_{30}D'_8D''_{22}M$.

11. The fiber as claimed in claim 3 wherein the silicone has the general formula: $MD_{250}D'_8D''_{22}M$.

12. The fiber as claimed in claim 2 wherein the silicone has the general formula: $MD_{247.5}D'_{10}D''_{7.5-10}M$.

13. The fiber as claimed in claim 2 wherein the silicone has the general formula: $MD_{250}D'_8D''_{10}M$ wherein R' is an octadecyl group.

14. The fiber as claimed in claim 2 wherein the silicone has the general formula: $MD_{250}D'_8D''_{10}M$ wherein R' is a decyl group.

15. The fiber as claimed in claim 2 wherein the silicone has the general formula: $MD_{250}D'_8D''_{10}M$ wherein R' is a hexacosanyl group, $C_{26}H_{53}$.

16. The fiber as claimed in claim 1 wherein D' is a siloxy unit of the formula:

R is methyl, R' is an alkyl group having 10 to 30 carbon atoms, x is an integer of 30 to 350, y is an integer of 5 to 12, z is an integer of 7 to 30, the ratio of $y/x+y+z$ is at least 0.01 and the ratio of $y+z/x+y+z$ is at least 0.03.

17. The fiber as claimed in claim 16 wherein R' is an octadecyl group, x is an integer of 100 to 300, y is an integer of 8 to 12, z is an integer of 10 to 28, the ratio of $y/x+y+z$ is 0.01 to 0.2 and the ratio of $y+z/x+y+z$ is 0.03 to 0.5.

18. The fiber as claimed in claim 17 wherein the silicone has the general formula: $MD_{300}D'_{12}D''_{12}M$.

19. The fiber as claimed in claim 17 wherein the silicone has the general formula: $MD_{300}D'_9D''_{12}M$.

20. The fiber as claimed in claim 17 wherein the silicone has the general formula: $MD_{247.5}D'_{10}D''_{10}M$.

21. The fiber as claimed in claim 17 wherein the silicone has the general formula $MD_{250}D'_8D''_{10}M$.

22. The fiber as claimed in claim 16 wherein the silicone has the general formula: $MD_{30}D'_8D''_{22}M$.

23. The fiber as claimed in claim 17 wherein the silicone has the general formula: $MD_{250}D'_8D''_{22}M$.

24. The fiber as claimed in claim 16 wherein the silicone has the general formula: $MD_{247.5}D'_{10}D''_{7.5-10}M$.

25. The fiber as claimed in claim 16 wherein the silicone has the general formula: $MD_{250}D'_8D''_{10}M$ wherein R' is an octadecyl group.

26. The fiber as claimed in claim 16 wherein the silicone has the general formula: $MD_{250}D'_8D''_{10}M$ wherein R' is a decyl group.

27. The fiber as claimed in claim 16 wherein the silicone has the general formula: $MD_{250}D'_8D''_{10}M$ wherein R' is a hexacosanyl group, $C_{26}H_{53}$.

28. A textile treated with a higher alkyl modified epoxy silicone terpolymer having the general formula: $MD_xD'_yD''_zM$ wherein M in each case is an end-blocking unit of the formula: $R_3SiO_{\frac{1}{2}}$; D is a siloxy unit of the formula: $R_2SiO$; D' is an epoxy containing siloxy unit of the formula:

$$E-C_bH_{2b}Si(R)O$$

where E is an epoxy containing group selected from either

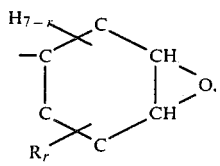
(a)

or

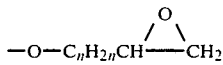
(b)

where n is from 1 to 12, D" is a siloxy unit of the formula R'Si(R)O; R is a lower alkyl group having 1 to 6 carbon atoms; R' is a higher alkyl group of at least 6 carbon atoms; x is an integer of 20 to 500; y is an integer of 4 to 15; z is an integer of 4 to 40; b is an integer of 2 to 12; and r is an integer of 0 to 7.

29. The textile as claimed in claim 28 wherein D' is a siloxy unit of the formula:

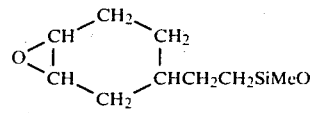

R is methyl, R' is an alkyl group having 10 to 30 carbon atoms, x is an integer of 30 to 350, y is an integer of 5 to 12, z is an integer of 7 to 30, the ratio of $y/x+y+z$ is at least 0.01 and the ratio of $y+z/x+y+z$ is at least 0.03.

30. The textile as claimed in claim 29 wherein R' is an octadecyl group, x is integer of 100 to 300, y is an integer of 8 to 12, z is an integer of 10 to 28, the ratio of $y/x+y+z$ is 0.01 to 0.2 and the ratio of $y+z/x+y+z$ is 0.03 to 0.5.

31. The textile as claimed in claim 30 wherein the silicone has the general formula: $MD_{300}D'_{12}D''_{12}M$.

32. The textile as claimed in claim 30 wherein the silicone has the general formula: $MD_{300}D'_9D''_{12}M$.

33. The textile as claimed in claim 30 wherein the silicone has the general formula: $MD_{247.5}D'_{10}D''_{10}M$.

34. The textile as claimed in claim 30 wherein the silicone has the general formula: $MD_{250}D'_8D''_{10}M$.

35. The textile as claimed in claim 28 wherein the silicone has the general formula: $MD_{250}D'_8D''_5M$.

36. The textile as claimed in claim 28 wherein the silicone has the general formula: $MD_{115}D'_4D''_{11}M$.

37. The textile as claimed in claim 29 wherein the silicone has the general formula: $MD_{30}D'_8D''_{22}M$.

38. The textile as claimed in claim 30 wherein the silicone has the general formula: $MD_{250}D'_8D''_{22}M$.

39. The textile as claimed in claim 29 wherein the silicone has the general formula: $MD_{247.5}D'_{10}D''_{7.5-10}M$.

40. The textile as claimed in claim 29 wherein the silicone has the general formula: $MD_{250}D'_8D''_{10}M$ wherein R' is an octadecyl group.

41. The textile as claimed in claim 29 wherein the silicone has the general formula: $MD_{250}D'_8D''_{10}M$ wherein R' is a decyl group.

42. The textile as claimed in claim 29 wherein the silicone has the general formula: $MD_{250}D'_8D''_{10}M$ wherein R' is a hexacosanyl group, $C_{26}H_{53}$.

* * * * *